(12) United States Patent
Moens et al.

(10) Patent No.: US 10,876,638 B2
(45) Date of Patent: Dec. 29, 2020

(54) INLET VALVE FOR A COMPRESSOR

(71) Applicant: ATLAS COPCO AIRPOWER, NAAMLOZE VENNOOTSCHAP, Wilrijk (BE)

(72) Inventors: Wim Moens, Wilrijik (BE); Andreas Mathias Jonas Seghers, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 69 days.

(21) Appl. No.: 15/511,732

(22) PCT Filed: Sep. 17, 2015

(86) PCT No.: PCT/BE2015/000044
§ 371 (c)(1),
(2) Date: Mar. 16, 2017

(87) PCT Pub. No.: WO2016/041024
PCT Pub. Date: Mar. 24, 2016

(65) Prior Publication Data
US 2017/0292616 A1    Oct. 12, 2017

(30) Foreign Application Priority Data

Sep. 19, 2014    (BE) .................................. 2014/0712

(51) Int. Cl.
*F16K 3/03* (2006.01)
*F04C 29/12* (2006.01)

(52) U.S. Cl.
CPC .............. *F16K 3/03* (2013.01); *F04C 29/124* (2013.01)

(58) Field of Classification Search
CPC . F16K 3/03; F16K 3/029; F16K 3/312; F04C 29/124
(Continued)

(56) References Cited

U.S. PATENT DOCUMENTS

| | | |
|---|---|---|
| 3,101,736 A | 8/1963 | Egger |
| 3,787,022 A | 1/1974 | Wilcox |

(Continued)

FOREIGN PATENT DOCUMENTS

| | | |
|---|---|---|
| CN | 203560478 U | 4/2014 |
| DE | 10 2012 011423 B3 | 11/2013 |

(Continued)

OTHER PUBLICATIONS

International Search Report for PCT/BE2015/000044 dated Apr. 14, 2016 [PCT/ISA/210].

(Continued)

*Primary Examiner* — Kelsey E Cary
(74) *Attorney, Agent, or Firm* — Sughrue Mion, PLLC

(57) ABSTRACT

An inlet valve that includes a pipe and a housing that forms a chamber around this pipe, in which an aperture is affixed with blades that are slidingly provided in the housing. Whereby these blades present a protruding section with edges that lie against one another and whereby the blades are provided with a spindle and there are means to enable the blades to pivot around these spindles, during the movement of the spindles, between a closed position, whereby the sections are oriented radially to close off the passage in the pipe, and an open position whereby the sections are turned away from the pipe.

25 Claims, 4 Drawing Sheets

(58) Field of Classification Search
USPC .......................................................... 251/212
See application file for complete search history.

(56) References Cited

U.S. PATENT DOCUMENTS

| | | | |
|---|---|---|---|
| 4,122,668 A | | 10/1978 | Chou et al. |
| 5,806,725 A * | | 9/1998 | Bennett ................ A21C 9/04 |
| | | | 137/624.13 |
| 6,666,237 B2 * | | 12/2003 | De Antoni Migliorati et al. ........ |
| | | | B65B 39/005 |
| | | | 141/286 |
| 8,316,820 B1 | | 11/2012 | Cammarata |
| 8,833,388 B2 * | | 9/2014 | Eto .................. H01L 21/67253 |
| | | | 137/487.5 |
| 2003/0127618 A1 | | 7/2003 | Wijaya |
| 2006/0201273 A1 * | | 9/2006 | Beckley ............... B60H 1/3407 |
| | | | 74/473.3 |
| 2009/0065081 A1 * | | 3/2009 | Luebbers ................ F16K 3/03 |
| | | | 138/46 |
| 2012/0227830 A1 * | | 9/2012 | Eto .................. H01L 21/67253 |
| | | | 137/67 |
| 2014/0124061 A1 | | 5/2014 | Daniels |
| 2015/0041695 A1 * | | 2/2015 | Daniels ................ F16K 3/03 |
| | | | 251/212 |

FOREIGN PATENT DOCUMENTS

| | | |
|---|---|---|
| GB | 306745 A | 2/1929 |
| GB | 579471 A | 8/1946 |
| GB | 957 884 A | 5/1964 |
| JP | 445667 Y | 2/1969 |
| JP | 5417531 A | 2/1979 |
| JP | 63116843 U | 7/1988 |

OTHER PUBLICATIONS

Written Opinion for PCT/BE2015/000044 dated Apr. 14, 2016 [PCT/ISA/237].
Communication dated Apr. 19, 2018 from the Intellectual Property Office of New Zealand in counterpart application No. 730647.
Translation of Communication dated Aug. 13, 2018, from Japanese Patent Office in counterpart application No. 2017-515176.
Communication dated Aug. 3, 2018, from Australian Patent Office in counterpart application No. 2015318761.
Communication dated Jul. 9, 2018, from State Intellectual Property Office of the P.R.C. in counterpart application No. 201580050146.X.

* cited by examiner

INLET VALVE FOR A COMPRESSOR

CROSS REFERENCE TO RELATED APPLICATIONS

This application is a National Stage of International Application No. PCT/BE2015/000044 filed Sep. 17, 2015, claiming priority based on Belgium Patent Application No. 2014/0712 filed Sep. 19, 2014, the content of all of which are incorporated herein by reference in their entirety.

BACKGROUND OF THE INVENTION

Field of the Invention

The present invention relates to an inlet valve for a compressor.

Background

It is known that in order to vary the flow rate of a compressor, the compressor inlet can be throttled.

To this end, conventionally, a valve is provided in the inlet conduit at the compressor inlet that can change the supplied gas flow and so can throttle the inlet.

Traditionally for example a butterfly valve is used for this purpose.

A disadvantage is that even when such a valve is fully opened it will still partially obstruct the inlet.

This will lead to a loss of performance as there is a certain restriction in the gas flow.

An inlet valve is known from DE 10.2012.011.423 whereby the passage in a pipe can be adjusted by means of blades that are affixed on skids that are slidable in the radial direction of the pipe in order to close off the passage of the pipe to a greater or lesser extent, whereby in this case these skids are formed by triangular guides protruding inwards that permanently obstruct the passage of the pipe. Also the blades, which for that matter are not shown in the drawings of DE 10.2012.011.423, always form a restriction of the passage of the pipe, even in the most radially retracted position of the skids.

Another disadvantage of the inlet valve of DE 10.2012.011.423 is that it defines a cruciform passage in the pipe as it were, with sharp parts protruding inwards that create turbulence that lead to undesired losses.

An inlet valve is known from U.S. Pat. No. 4,122,668 with turnable blades that is mounted in the inlet channel of a turbine and which thus means an obstruction of the gas flow to the turbine. The passage that is defined by the blades is also of an irregular shape with angular edges that cause turbulences, whereby the irregular shape of the passage is not constant either, which makes control by the position of the blades difficult.

SUMMARY OF THE INVENTION

The purpose of the present invention is to provide a solution to at least one of the aforementioned and other disadvantages.

The subject of the present invention is an inlet valve for a compressor, whereby this inlet valve is intended to be provided in an inlet conduit of the compressor, whereby the inlet valve comprises a pipe for connection to the inlet conduit and a housing that extends around this pipe and which forms a chamber with two walls located opposite one another, respectively a base and a cover, that extend laterally around the pipe, whereby in this chamber the inlet valve comprises an aperture in the shape of a number of blades that are slidingly provided on the base, whereby these blades present a protruding section and which lie against or in one another by the edges of the protruding section and whereby the blades are provided with a spindle that is slidable in a radially oriented slot in the base and means are provided to enable the blades to pivot simultaneously around these spindles, during the radial movement of the spindles in the aforementioned slots, between a closed position whereby the protruding sections are oriented radially to close off the passage in the pipe, and an open position whereby the protruding sections are turned away from the pipe.

Protruding section of the blade means the section of the blade that is used to close off the passage in the pipe. In addition to this protruding section the blade also has a section with which it is slidingly provided on the base.

An advantage of such an inlet valve is that the blades of the aperture can be fully turned back in the chamber.

In this way the passage of the pipe is completely clear so that there is no restriction in the gas flow. This will lead to a better and more efficient operation when the full flow of the compressor is required.

Preferably the means are formed by the blades being provided with a guide edge turned away from the point of the protruding section, which due to the contact with a fixed ridge on the base forces the blade to pivot around the aforementioned spindle during the radial movement of the spindle in the aforementioned radially oriented slot.

An advantage of this is that it is easy to realize. Moreover no moving parts are required, such that wear or failure of the means is minimal.

In a preferred embodiment the inlet valve comprises a drive for opening and closing the inlet valve that is provided thereon, to at least move one of the aforementioned spindles radially in the radially oriented slot.

Because the edges of the protruding sections lie against or in one another, during the radial movement of one spindle the other spindles or blades will automatically move with it because the blade will pivot around the spindle at the same time as the radial movement.

In other words: it is only necessary to actively move one blade with a drive in order to move all blades simultaneously.

As the drive only has to drive one spindle the drive can have a relatively simple construction.

In a practical embodiment at least one of the aforementioned spindles of the blades extends on either side of the blade with a first section that is slidable in the radially oriented slot of the base and a second section that is slidingly held in line therewith in a slot of a turntable that is turnably affixed, by means of an actuator, between the blades and the cover of the housing such that a rotation of the turntable causes a radial movement of the blades.

The actuator and the turntable can be considered as the drive.

According to a preferred characteristic of the invention the edges of the protruding section with which the blades lie against one another are provided with a profiling whereby these edges slide into one another with a close fit.

This will ensure a good closure between the different blades, so that no undesired gas flow can occur through the inlet valve when it is closed.

In a preferred embodiment the blades are flat, whereby they preferably lie in the same plane.

This means that they will also be moved and will pivot in the aforementioned plane.

Such an embodiment differs from a known aperture, whereby the blades slide over one another when opening and closing the valve.

The shape and dimensions of the constituent parts of the inlet valve are preferably such that in all states of the inlet valve the blades define a passage with a circular or approximately circular periphery or in the shape of an inscribed regular polygon.

As a result it lacks sharp parts protruding inwards that could lead to undesired turbulence and the flow losses coupled therewith.

Additionally the opening and closing of the inlet valve is coupled to a proportionate increase and decrease of the flow allowed through, which enables a simple and stable control.

BRIEF DESCRIPTION OF THE DRAWINGS

With the intention of better showing the characteristics of the invention, a few preferred embodiments of an inlet valve for a compressor according to the invention are described hereinafter by way of an example, without any limiting nature, with reference to the accompanying drawings, wherein.

DETAILED DESCRIPTION OF THE INVENTION

Figure 1:
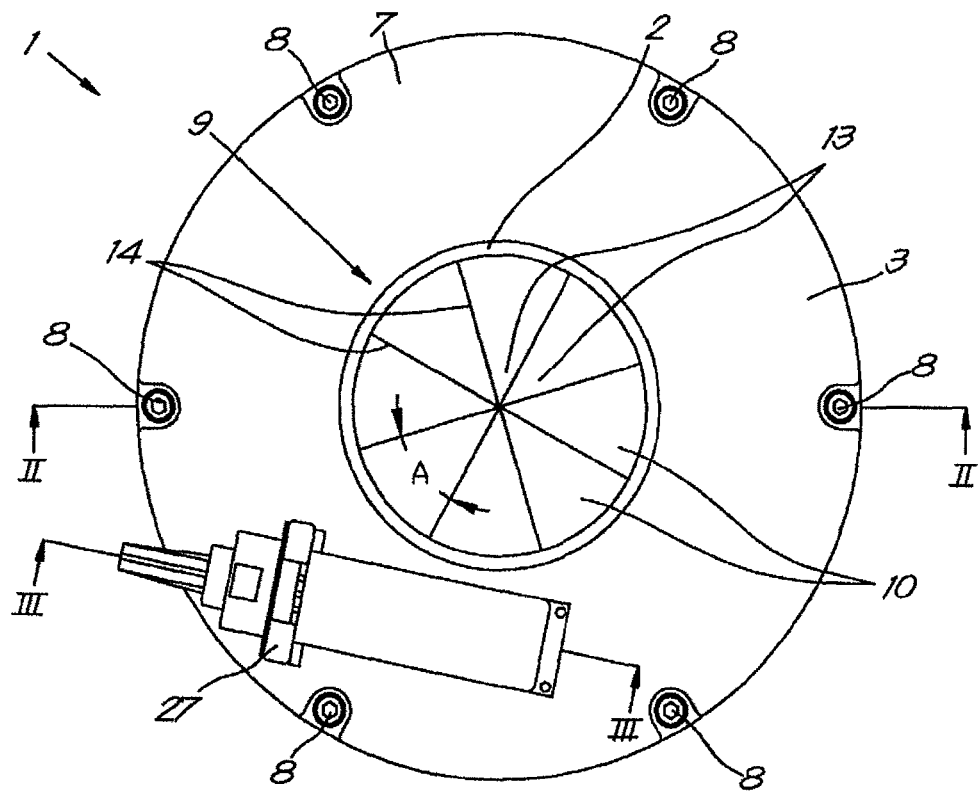
FIG. 1 schematically shows a top view of an inlet valve according to the invention.
Figure 2:
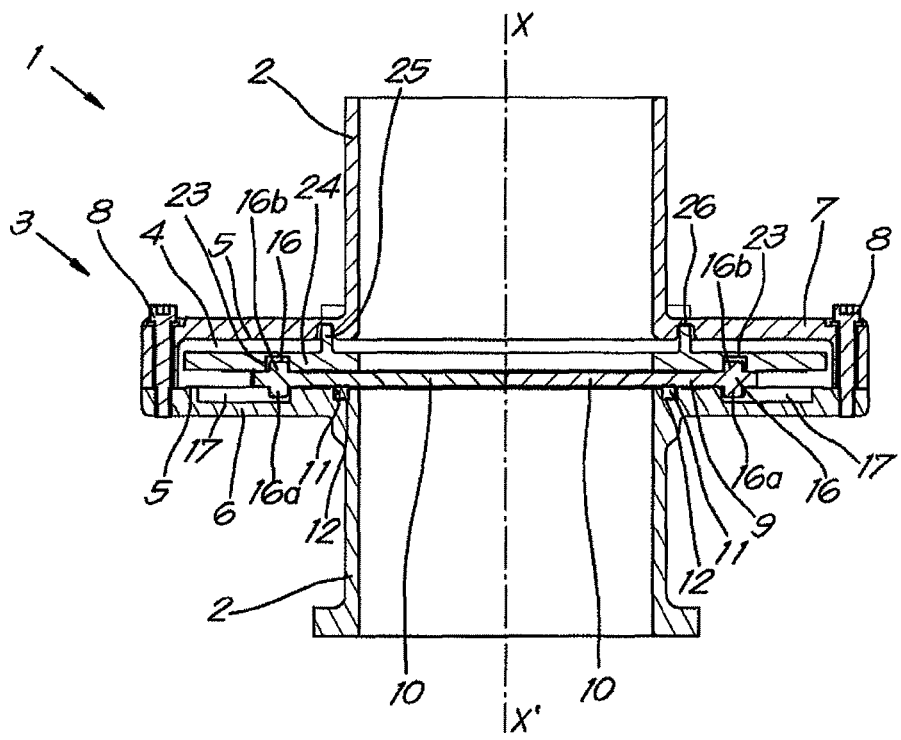
FIG. 2 schematically shows a cross-section according to the line II-II of FIG. 1.
Figure 3:
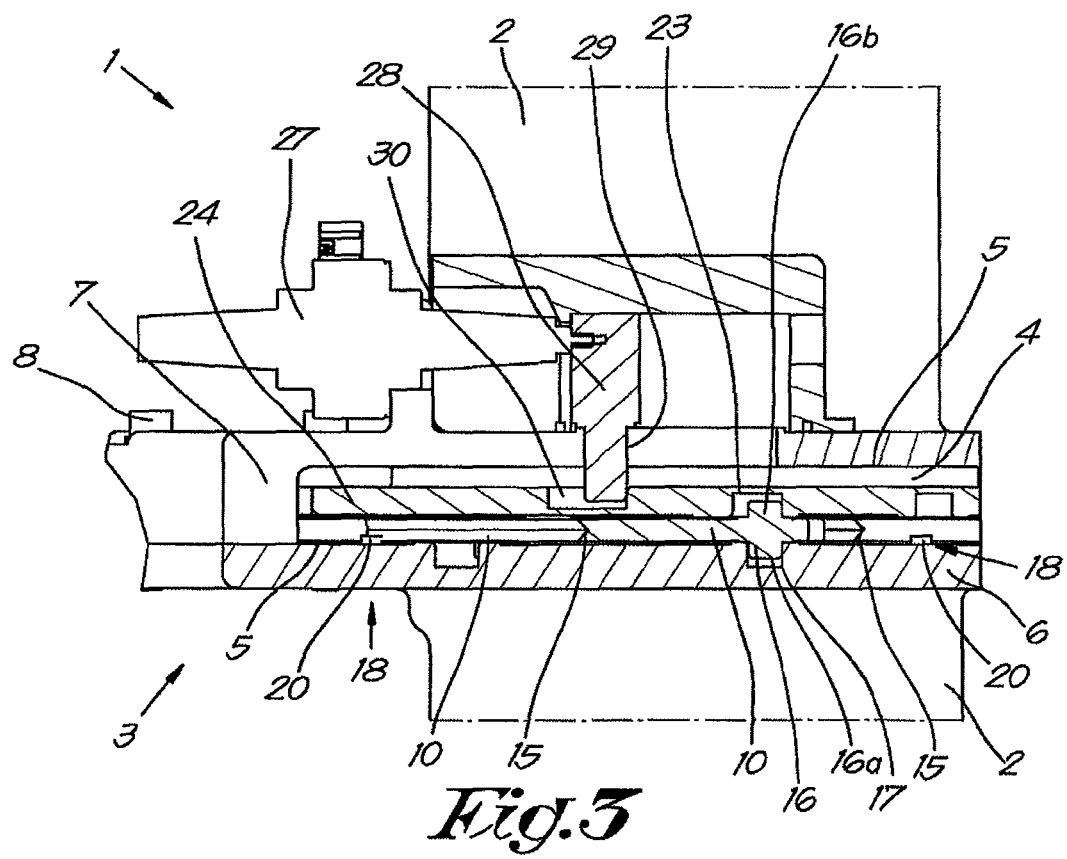
FIG. 3 schematically shows a cross-section according to the line III-III of FIG. 1.

The inlet valve 1 shown in FIGS. 1 to 3 comprises a pipe 2, which is intended to be connected to an inlet conduit of a compressor.

A housing 3 extends around the pipe 2 that defines a chamber 4.

The chamber 4 comprises two walls 5 opposite one another, that are formed by a base 6 and a cover 7 of the housing 3.

In this case, but not necessarily, the cover 7 and the base 6 extend perpendicularly to the axis X-X' of the pipe 2.

The section of the pipe 2 that is connected to the base 6 is in this case intended to be connected to the inlet conduit of a compressor. It is also possible that the cover 7 is intended to be connected to the inlet conduit.

As can be seen in FIGS. 1 and 2, the base 6 and the cover 7 are two separate pieces that can be fastened together by means of screws 8. Instead of screws 8, other fastening means can also be used such as bolts, clips, bayonet joint or similar without departing from the scope of the invention.

It is also possible that the cover 7 and the base 6 are fastened detachably to one another to enable maintenance and repairs of the inlet valve 1 for example.

Figure 4:
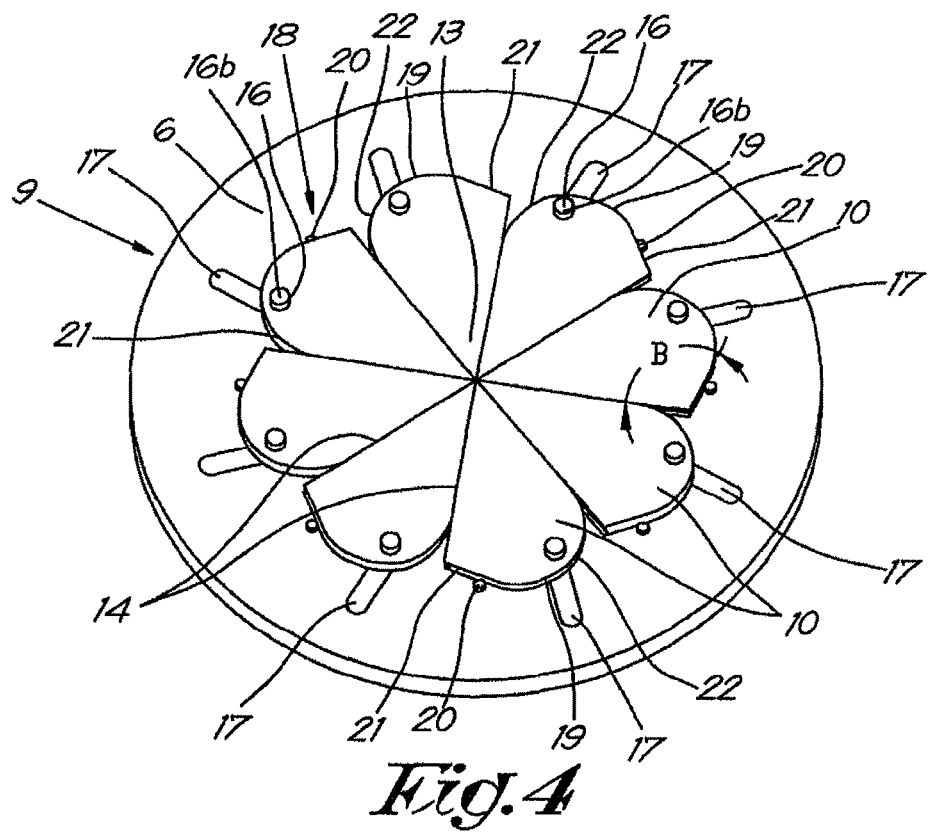
FIG. 4 schematically shows a perspective view of the aperture of the inlet valve of FIG. 1.

In the chamber 4 the inlet valve 1 comprises an aperture 9. As can be seen in FIG. 4, this aperture 9 comprises a number of blades 10, in this case eight blades 10.

It is clear that it is not necessary for there to be eight blades 10, there can also be more or less than eight blades 10.

The precise number of blades 10 will depend, for example, 10 on the playoff between the fewest possible components and a good and accurately controllable aperture 9.

In this case all blades 10 are identical with an identical shape and dimensions.

In the example shown the blades 10 are flat, whereby they all lie in the same plane.

The blades 10 are slidingly provided on the base 6 in this plane. To this end the base 6 is made flat.

In the base 6 of the housing 3, an X-ring 11 is provided in a groove 12 provided to this end in the base 6. This X-ring 11 ensures a closure between the base and the blades 10 that are affixed against the base 6.

It is clear that the groove 12 can also be made in the cover 7 instead of in the base 6. The X-ring 11 will then ensure a closure between the cover 7 and the blades 10.

It is also clear that instead of an X-ring 11 a different type of seal can be used such as an O-ring, for example. The function that the seal must satisfy is to ensure a seal along the inside of the inlet valve.

The blades 10 present a protruding section 13, whereby the blades 10 lie against one another by the edges 14 of this protruding section 13.

Figure 6:
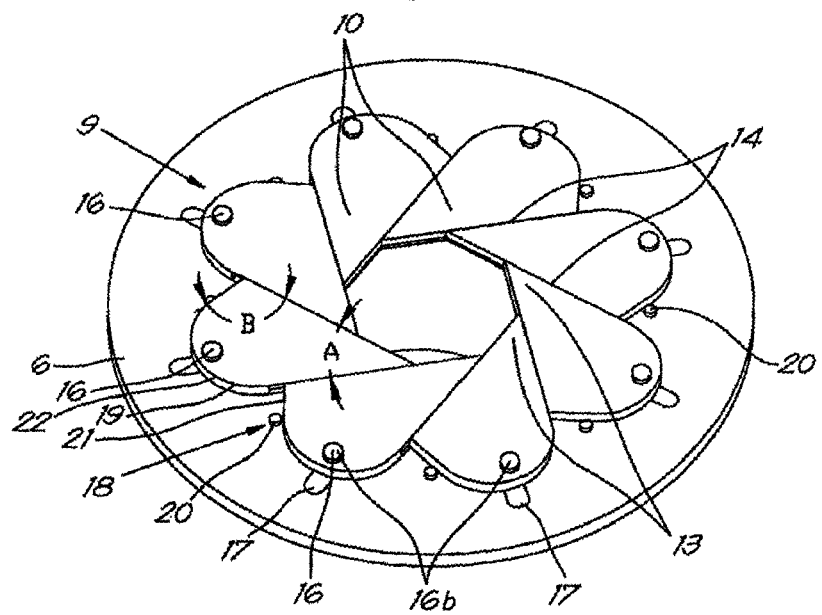
FIGS. 6 and 7 schematically show a perspective view of two other states of the aperture of FIG. 4.

The shape of the blades 10 is such that they define a passage in each position with a circular or approximately circular periphery or an inscribed regular polygon, as shown in FIG. 6, without sharp parts protruding inwards.

In this case the protruding section 13 has a wedge shape with straight edges 14. In the following the protruding section 13 will also be called the wedge-shaped section 13.

It is clear that the protruding section 13 does not necessarily have to be wedge-shaped. The protruding section 13 can also take on another shape without departing from the scope of the invention.

The aforementioned edges 14 are provided with a profiling 15 so that the edges slide into one another with a close fit. In this case one edge 14 is provided with concave edge, while the other edge 14 is provided with a convex edge. This can be seen in FIG. 3.

It is also possible that the edges are provided with a dovetail joint, whereby one of the edges 14 of the wedge-shaped section 13 is provided with a dovetail pin and the other edge 14 is provided with a dovetail socket.

As a result a good closure can be obtained between the blades 10 mutually.

The angle A that the edges 14 of the wedge-shaped section 13 include is equal to 360° divided by the number of blades 10, thus in this case 45°.

The blades 10 are made sufficiently sturdy so that they can withstand the pressures in the compressor, for example by being made of a suitable material such as aluminium or stainless steel for example, and/or by making them relatively thick. As a result it will also be possible to provide the edges 14 of the wedge-shaped sections 13 with a profiling 15.

As already stated, the blades 10 are slidingly provided on the base 6 of the housing 3. To this end the blades 10 are provided with a spindle 16 that it is slidable in a radially oriented slot 17 in the base 6. This is shown in FIG. 4.

In this way a radial movement of the spindle 16 in the slot 17 will cause a radial movement of the blade 10.

Means 18 are also provided to enable the blades 10 to simultaneously pivot around these spindles 16 during a radial movement of the spindles 16 in the slots 17.

These means 18 are formed by the blades 10 being provided with a guide edge 19 turned away from the point of the wedge-shaped section 13 that can engage with a fixed ridge 20 on the base 6 of the housing 3, as shown in FIG. 4.

This ridge 20 will ensure that the blade 10 is forced to pivot around the spindle 16 when the spindle 16 is moved in the slot 17 because the ridge 20 will come against the guide edge 19.

The guide edge 19 is provided with a straight section 21 that extends at an angle B to an edge 14 of the wedge-shaped section 13. In this case this angle B is obtuse.

The fixed ridge 20 will act on this straight section 21 to cause a pivoting of the blades 10. This straight section 21 is connected by means of a rounded section 22 to the other edge 14 of the wedge-shaped section 13.

In this case the rounded section 21 is circular, whereby the center of the circular section is at a radial distance from the point of the wedge-shaped section 13.

In order to realize the radial movement of the spindles 16, and thus also the movement of the blades 10, at least one of the aforementioned spindles 16 of the blades 10 extends on either side of the blade 10. In this case all spindles 16 extend through the blades 10, but this does not necessarily need to be the case.

A first section 16a is slidable in the radially oriented slot 17 of the base 6, the second section 16b is held slidingly in a slot 23 of a turntable 24.

Figure 5:
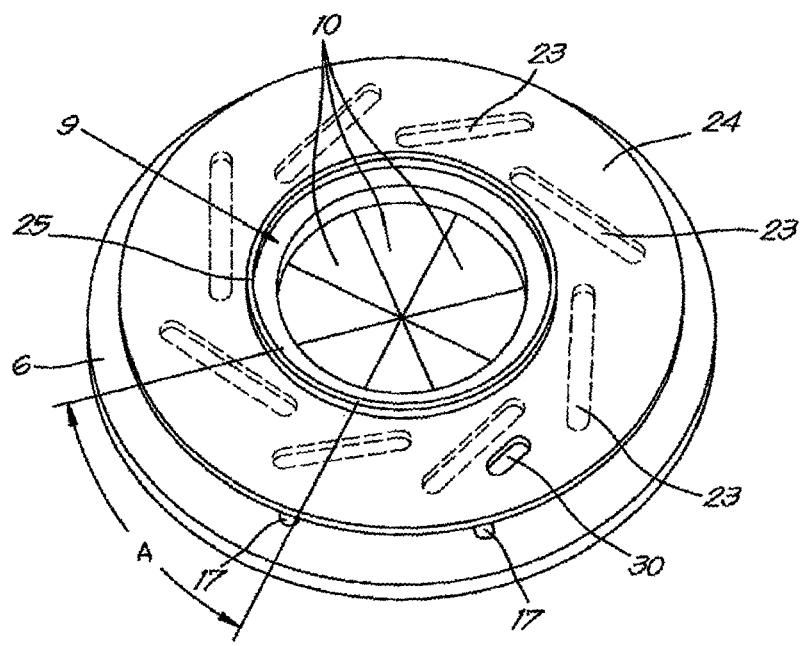
FIG. 5 shows the aperture with the turntable of the inlet valve of FIG. 1.

As shown in FIG. 5 and also in FIG. 2, this turntable 24 is on the blades 10, more specifically between the aperture 9 and the cover 7 of the housing 3.

On the side that is turned towards the blades 10 the turntable 24 is provided with the aforementioned slots 23 in which the second sections 16b of the spindles 16 are held.

FIG. 5 shows the orientation of these slots 23 with a dashed line.

Due to the relative orientation of the slots 17 in the base 6 with respect to the slots 23 in the turntable 24, a rotation of the turntable 24 with respect to the base 6 will ensure that the spindles 16, and thus the blades 10, are moved radially.

The turntable 24 is provided with a ring-shaped upright edge 25 that is held turnably in a corresponding circular slot 26 in the Cover 7, whereby this ring-shaped upright edge 25 acts as a bearing for the turning of the turntable 24 around the axis X-X' of the pipe 2. In this way the relative position of the turntable 24 will remain fixed with respect to the cover 7.

In order to turn the turntable 24, an actuator 27 is provided, in this case a linear actuator.

As shown in FIG. 3, the turntable 24 is provided with an operating pawl 28 that extends through a slot 29 that extends in a lateral or transverse direction in the cover 7, whereby this operating pawl 28 is slidable in this slot 29 by means of the aforementioned actuator 27 to open and close the inlet valve 1 by turning the turntable 24.

The operating pawl 28 is affixed in a slip hole 30 in the turntable 24, as shown in FIG. 5, in order to be able to realize a turn of the turntable 24 with a straight movement of the operating pawl 28.

The operation of the inlet valve 1 is very simple and as follows.

During use, the pipe 2 of the inlet valve 1 will be connected to the inlet conduit of a compressor.

When the inlet valve 1 is closed, as shown in FIGS. 1 and 4, no gas will be allowed through, neither in the one direction nor in the other direction. This thus means that no compressed gas can escape from the compressor to the environment via the inlet valve 1.

This occurs because the edges 15 of the wedge-shaped sections 13 close against one another in an airtight manner, and because the seal, in this case the X-ring 11 in the base 6, ensures the necessary seal between the blades 10 and the base 6 of the housing 3.

When a supply of gas is required, the inlet valve 1 will be opened.

This is done by means of the actuator 27, which will move the operating pawl 28 in the slot 29 through the cover 7.

As the operating pawl 27 engages with the slip hole 30 in the turntable 24, the operating pawl 27 will turn the turntable 24 due to this movement.

Due to this rotation the slots 23 in the turntable 24 will move with respect to the slots 17 in the base 6 and the turntable 24 will cause a radial movement of the spindles 16, that extend with their one end 16b in the slots 23 of the turntable 24 and extend with their other end 16a in the slots 17 of the base 6. In this case the spindles 16 will be moved outwards radially.

It is clear that the turntable 24, in combination with the actuator 27, can be considered as a drive for opening and closing the inlet valve 1 by moving at least one of the spindles 16 in the radially oriented slots 17 in the base 6.

As a result the blades 10 move in a radial direction. Due to the action of the ridges 20 on the guide edge 19, this will be coupled with a simultaneous pivoting of the blades 10 around the spindle 16.

This is shown in FIG. 6 where the inlet valve 1 is partly opened. As can be seen in this drawing, the slots 10 are pivoted or rotated clockwise around the spindles 16.

Because the blades 10 will pivot under the influence of the ridges 20 during the radial movement of the spindles 16 in the radially oriented slots 17 in the base 6, when opening the inlet valve 1 the blades 10 as it were turn away from the pipe 2 and are completely or least partially retracted into the chamber 4 of the housing 3 in such a way that the passage in the pipe 2 is not obstructed by the blades 10 at the location of the inlet valve 1.

Figure 7:
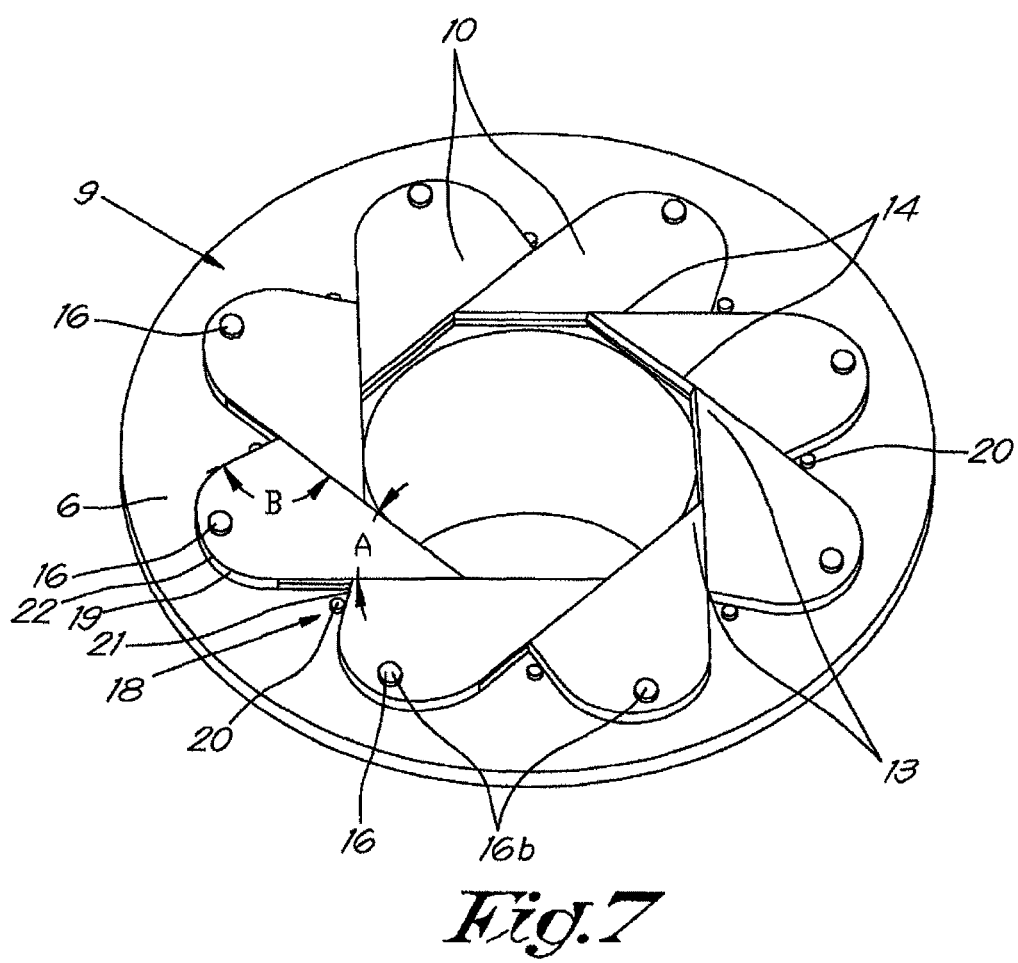

By further moving the turntable 24 the blades will finally be completely in the chamber 4, as shown in FIG. 7.

In this way the entire cross-section of the pipe 2 will be clear, so that in the completely open state of the inlet valve 1 there is no restriction of the gas flow.

It is important to note that with this movement of the blades 10, the edges 14 of the wedge-shaped sections 13 as it were form a guide for the wedge-shaped sections 13.

In this way the opening and closing of the aperture 9 of the inlet valve 1 can be done with a smooth continuous movement.

In order to close the aperture 9 of the inlet valve 1, the turntable 24 is rotated in the other direction, by moving the operating pawl 28 with the actuator 27 in the other direction.

As a result the blades 10 pivot back out of the chamber 4 towards the pipe 2, and the spindles 16 move simultaneously in the radial direction in the slots 17 in the base 6 so that the blades 10 again at least partially obstruct the cross-section of the pipe 2.

The present invention is by no means limited to the embodiments described as an example and shown in the drawings, but such an inlet valve for a compressor can be realized in all kinds of forms and dimensions without departing from the scope of the invention.

The invention claimed is:

1. An inlet valve for a compressor, whereby the inlet valve (1) is configured to be provided in an inlet conduit of the compressor, the inlet valve (1) comprising:

a pipe (2) for connection to the inlet conduit and a housing (3) that extends around the pipe (2) and which forms a chamber (4) with two walls (5) located opposite one another, and respectively a base (6) and a cover (7), that extend laterally around the pipe (2), wherein in the chamber (4) the inlet valve (1) comprises an aperture (9) in a shape of a number of blades (10) that are slidingly provided on the base (6), wherein the blades (10) present a protruding section (13) and lie against or in one another by edges (14) of the protruding section (13) and wherein the blades (10) are provided with a spindle (16) that is slidable in a radially oriented slot (17) in the base (6), and means (18) are provided to enable the blades (10) to pivot simultaneously around the spindles (16), during a radial movement of the spindles (16) in the slots (17), between a closed position whereby the protruding sections (13) are oriented radially to fully close off the passage in the pipe (2), and an open position whereby the protruding sections (13) are turned away from the pipe (2), wherein the means (18) are formed by the blades (10) being provided with guide edges (19) extended away from a point of the protruding section (13) which, due to contact between each of the guide edges (19) and respective ones of separate fixed ridges (20) on the base (6), forces the blade (10) to pivot around the spindle (16) during the radial movement of the spindle (16) in the radially oriented slot (17), wherein in each of the closed position, the open position, and transitioning between ones of the closed position and open position, the guide edges (19) remain in contact with same ones of the respective ones of the separate fixed ridges (20), and wherein, in a direction from the center of the base (6) to an outer periphery of the base (6):
  a furthest portion of the radially oriented slot (17) away from the center is further away from the center than are the fixed ridges (20), and
  a closest portion of the radially oriented slot (17) to the center is closer to the center than are the fixed ridges (20).

2. The inlet valve according to claim 1, wherein the guide edge (19) is provided with a straight section (21) that extends at an angle (B) by an edge (14) of the protruding section (13) and which connects thereto.

3. The inlet valve according to claim 2, wherein the angle (B) is an obtuse angle.

4. The inlet valve according to claim 2, wherein the straight section (21) is connected to the other edge (14) of the protruding section (13) by means of a rounded section (22).

5. The inlet valve according to claim 4, wherein the rounded section (22) forms a portion of a circle and the center of the portion of the circle is at a radial distance from the point of the protruding section (13).

6. The inlet valve according to claim 1, wherein the inlet valve (1) comprises a drive for opening and closing the inlet valve (1) that is provided thereon to move at least one of the spindles (16) radially in the radially oriented slot (17).

7. The inlet valve according to claim 1, wherein at least one of the spindles (16) of the blades (10) extends on either side of the blade (10) with a first section (16a) that is slidable in the radially oriented slot (17) of the base (6) and a second section (16b) extending in line therewith that is slidingly held in a slot (23) of a turntable (24) that is turnably affixed between the blades (10) and the cover (7) of the housing (3) by means of an actuator (27), such that a turn of the turntable (24) causes a radial movement of the blades (10).

8. The inlet valve according to claim 7, wherein the actuator (27) is a linear actuator.

9. The inlet valve according to claim 7, wherein all spindles (16) extend through the blades (10).

10. The inlet valve according to claim 7, wherein the turntable (24) is provided with a ring-shaped upright edge (25) that is turnably held in a corresponding circular slot (26) in the cover (7), whereby this ring-shaped upright edge (25) acts as a bearing for the rotation of the turntable (24) around the axis X-X' of the pipe (2).

11. The inlet valve according to claim 7, wherein the turntable (24) is provided with an operating pawl (28) that extends through a slot (29) that extends in a lateral or transverse direction in the cover (7), whereby this operating pawl (28) is slidable in this slot (29) by means of the aforementioned actuator (27) in order to open and close the inlet valve (1) by turning the turntable (24).

12. The inlet valve according to claim 1, wherein the edges (14) of the protruding section (13) with which the blades (10) lie against one another are provided with a profiling (15), whereby these edges (14) slide into one another with a close fit.

13. The inlet valve according to claim 12, wherein to this end one edge (14) is provided with a concave edge while the other edge (14) is provided with a convex edge or that one edge (14) is provided with a dovetail pin while the other edge (14) is provided with a dovetail socket.

14. The inlet valve according to claim 1, wherein a seal is provided in a circular groove (12) in the base (6) or in the cover (7) of the housing (3) provided to this end that ensures a closure between the blades (10) and the base (6) or the cover (7).

15. The inlet valve according to claim 1, wherein the base (6) and the cover (7) are two separate pieces that can be fastened together by fasteners.

16. The inlet valve according to claim 1, wherein the section of the pipe (2) that is connected to the base (6) or the cover (7) is intended to be connected to the inlet conduit of a compressor.

17. The inlet valve according to claim 1, wherein the aperture (9) comprises eight blades (10).

18. The inlet valve according to claim 1, wherein the blades (10) are flat.

19. The inlet valve according to claim 1, wherein the blades (10) are in the same plane.

20. The inlet valve according to claim 1, wherein the base (6) is flat and the blades (10) are flat blades (10).

21. The inlet valve according to claim 1, wherein all blades (10) are identical.

22. The inlet valve according to claim 1, wherein the protruding section (13) of the blades (10) has a wedge shape with straight edges (14).

23. The inlet valve according to claim 22, wherein an angle (A) that the edges (14) of the protruding section (13) include is equal to 360° divided by the number of blades (10).

24. The inlet valve according to claim 1, wherein the entire cross-section of the pipe (2) is clear in the open state of the inlet valve (1).

25. The inlet valve according to claim 1, wherein the shape and dimensions of the constituent parts of the inlet valve are such that, in all states of the inlet valve, the blades define a passage with a circular periphery or in the shape of an inscribed regular polygon.

\* \* \* \* \*